UNITED STATES PATENT OFFICE.

JAMES L. HASTINGS, OF PHILADELPHIA, PENNSYLVANIA, ASSIGNOR, BY MESNE ASSIGNMENTS, TO THE WELSBACH INCANDESCENT GAS LIGHT COMPANY, OF GLOUCESTER CITY, NEW JERSEY.

PROCESS OF PRODUCING REFRACTORY COMPOUNDS.

SPECIFICATION forming part of Letters Patent No. 396,693, dated January 22, 1889.

Application filed March 20, 1886. Serial No. 195,924. (No specimens.)

*To all whom it may concern:*

Be it known that I, JAMES L. HASTINGS, a citizen of the United States, residing at Philadelphia, in the county of Philadelphia and State of Pennsylvania, have invented certain new and useful Improvements in the Process of Producing Refractory Compounds; and I do hereby declare the following to be a full, clear, and exact description of the invention, such as will enable others skilled in the art to which it appertains to make and use the same.

This invention relates to the process of producing refractory and vitreous or crystalline compounds for use in chemical and other arts, and for incandescent illumination, by means of a gas-flame or other source of heat, said compound being adapted for molding into articles of various forms and for coating metallic and other articles to protect them from the oxidizing and corroding influence of air, moisture, acids, &c., and from injury by heat. The plastic compound, when properly burned or fired, is highly refractory, very hard, crystalline in structure, rough on the surface, white or opalescent, and practically infusible.

The principal object of the invention is to produce a readily incandescing compound, capable of resisting the action of intense heat, and particularly adapted for forming incandescent burners or attachments for burners for illumination with coal-gas, water-gas, or natural gas, or other source of heat.

In carrying out my invention I thoroughly mix and then combine under the influence of a high heat in a gas or other furnace, or a gas-flame in the open air, two or more mineral compound bodies or substances—such as oxides, carbonates, or sulphates of metals as a base—and one or more of the haloid salts (comprising chlorides, bromides, iodides, and fluorides) as a flux or binding material, and a suitable moistening-fluid—as perchloric acid or peroxide of hydrogen—whereby the mineral substances or compounds may be united in different proportions (without regard to chemical equivalents) and caused to crystallize together without losing their solid form. For the base of my compounds I preferably use oxides, carbonates, or sulphates of strontium, calcium, magnesium, barium, and aluminium, and for fluxes or binders I may use a great variety of the haloid salts, among which may be mentioned prominently calcium iodide, calcium bromide, sodium chloride, strontium chloride, magnesium chloride, calcium chloride, calcium fluoride, and magnesium iodide. These and other haloid salts are important features in this invention. In this application I also lay stress upon the fluids used for moistening the powdered mineral substances—salts, &c.—to bring the composition to the proper plastic condition for molding. Such fluids are preferably perchloric acid, peroxide of hydrogen, and potassium permanganate dissolved in water, any one or more of them being used in any particular compound, since I have found that by their use improved results are secured.

Having stated the general nature and important features of my invention, I will now describe in detail particular formulas for compounds and their method of preparation, which I have found among many others to give good results.

*Formula No. 1.*—I take for a base the following substances:

| | Grains. |
|---|---|
| Strontium oxide (caustic) | 50 |
| Strontium carbonate | 50 |
| Calcium oxide | 50 |
| Calcium carbonate | 50 |
| Magnesium oxide | 75 |
| Magnesium carbonate | 25 |
| Total | 300 |

This mixture is pulverized and thoroughly mixed with a flux or binding material composed of the following salts:

| | Grains. |
|---|---|
| Calcium iodide | 30 |
| Magnesium chloride | 50 |
| Strontium chloride | 30 |
| Calcium fluoride | 30 |
| Total | 140 |

The ingredients of this binder are first ground or pulverized separately, forming a mixture of the consistency of thin paste. The pulverized ingredients of the base are added and mixed with this paste, and at the same time sufficient perchloric acid is added to bring the whole to the proper plastic consistence for molding or pressing into rods or tubes or other desired forms. Articles formed of this plastic composition may be dried at a moderate heat and then fired in the furnace or gas-flame in the usual way.

Another formula, which may be designated formula No. 2, is prepared as follows for a base:

| | Grains. |
|---|---|
| Strontium oxide (caustic) | 65 |
| Strontium carbonate | 65 |
| Calcium oxide | 85 |
| Calcium carbonate | 85 |
| Magnesium oxide | 75 |
| Total | 375 |

These ingredients are pulverized, and at the proper time are mixed with the prepared binding composition, which is made up in two batches, differently prepared, as stated below. The first part of the binder composition is composed of the following salts:

| | Grains. |
|---|---|
| Calcium iodide | 25 |
| Magnesium iodide | 20 |
| Magnesium chloride | 75 |
| Strontium chloride | 15 |
| Total | 135 |

These salts are mixed and pulverized and then subjected to heat in a platinum crucible or small dish until the water of crystallization is driven off, and after having been brought to a fused state is allowed to cool. It is then pulverized and added to the composition forming the base. None of the chlorine, and but part of the iodine, is driven off in the operation of heating, care being taken to retain these elements on account of their beneficial effect when mixed with the base. The object of driving off the water and volatile matter is to get as much chlorine and iodine into the base as possible, with little or no water of crystallization, as if such water is not removed the finished composition is apt to melt down under the heat of the Bunsen burner or furnace when being fired.

The second part of the binder composition is composed of the same salts as the first part, as follows:

| | Grains. |
|---|---|
| Calcium iodide | 20 |
| Magnesium iodide | 20 |
| Magnesium chloride | 75 |
| Strontium chloride | 20 |
| Total | 135 |

This mixture is simply worked into a paste and mixed with the base. All ingredients of the composition are mixed together and pulverized, and the mixture is moistened, either with perchloric acid or a solution of permanganate of potassium in water or peroxide of hydrogen, so as to form a plastic composition suitable for molding in forms.

Another formula for a compound which readily becomes incandescent and gives a good light is formed as follows for a base—

| | Grains. |
|---|---|
| Strontium oxide | 170 |
| Calcium oxide | 225 |
| Magnesium oxide | 125 |
| Total | 520 |

To these pulverized ingredients there is added a binder composition composed as follows:

| | Grains. |
|---|---|
| Calcium iodide | 20 |
| Calcium bromide | 20 |
| Sodium chloride | 20 |
| Strontium chloride | 50 |
| Magnesium chloride | 100 |
| Calcium chloride | 30 |
| Calcium fluoride | 30 |
| Total | 270 |

These salts are pulverized and mixed with ingredients of the base, sufficient glycerine being used to form a plastic composition for molding into forms.

The plastic composition is molded into slender rods or pencils and into tubes or other desired forms, and may be coated upon articles of metal or other material, and in such forms is subjected to a low drying temperature to drive off the moisture or more volatile matter, and then to a high temperature in a gas or other furnace, and may afterward be suspended in a gas-flame for completing the process of burning and for testing and proving the finished articles.

The proportions of mineral ingredients above mentioned for forming the compounds and various forms of burners and burner attachments give satisfactory results; but I do not limit myself to the proportions stated, as other proportions will give good results, and they may be varied without departing from my invention.

I have used a great variety of haloid bodies or salts in forming incandescing compounds— such as chlorides of zirconium, zinc, lead, cobalt, aluminium, ammonium, antimony, nickel, manganese, lithium, iron, iridium and osmium, copper, cromium, bismuth, barium, platinum, potassium, thalium, tin, and uranium—besides those mentioned in the above formulas, and I have also used many of the iodides and bromides of these metals. I have made over two hundred variations from or modifications of the formulas above stated, using materials for producing light by incandescence, and have had good results in each trial. Various special mixtures or compounds of mineral substances, some of which are above mentioned, are made the subjects of applications for patents, and I make no claim to such special compounds in this application.

Having described my invention, what I claim, and desire to secure by Letters Patent, is—

1. The process of producing a refractory crystalline compound, which consists in forming a base from two or more pulverized mineral substances—such as oxides, carbonates, or sulphates of metals—then adding a haloid salt, then moistening and molding the mixture, then subjecting the mixture to a low drying-heat, and finally exposing it to a high temperature, substantially as described.

2. The process of producing a refractory crystalline compound, which consists in forming a base from two or more pulverized mineral substances—such as oxides, carbonates, or sulphates of metals—then mixing said base with a flux composed of one or more haloid salts—such as chlorides, iodides, fluorides, or bromides of metals—then moistening the mixture with perchloric acid or its equivalent, then molding the mixture and subjecting it to a low drying-heat, and finally exposing the compound to a high temperature, substantially as described.

In testimony whereof I affix my signature in presence of two witnesses.

JAMES L. HASTINGS.

Witnesses:
    CHAS. MATHEWS, Jr.,
    JOHN L. STEWART.